(12) United States Patent
Aaron et al.

(10) Patent No.: US 7,742,961 B2
(45) Date of Patent: Jun. 22, 2010

(54) METHODS, SYSTEMS, AND COMPUTER PROGRAM PRODUCTS FOR MANAGING SERVICES ACCOUNTS THROUGH ELECTRONIC BUDGET ADJUSTMENTS BASED ON DEFINED RULES

(75) Inventors: Jeffrey A. Aaron, Atlanta, GA (US); Jun-Gang Alin, Duluth, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 543 days.

(21) Appl. No.: 11/250,881

(22) Filed: Oct. 14, 2005

(65) Prior Publication Data

US 2007/0088641 A1    Apr. 19, 2007

(51) Int. Cl.
*G06Q 40/00* (2006.01)
(52) U.S. Cl. ...................................................... 705/35
(58) Field of Classification Search .................... 705/35
See application file for complete search history.

(56) References Cited

U.S. PATENT DOCUMENTS

| | | | | |
|---|---|---|---|---|
| 5,852,811 A * | 12/1998 | Atkins | ...................... | 705/36 R |
| 6,980,511 B1 * | 12/2005 | Li et al. | ...................... | 370/230 |
| 7,058,951 B2 * | 6/2006 | Bril et al. | ...................... | 718/104 |
| 7,254,548 B1 * | 8/2007 | Tannenbaum | ................. | 705/18 |
| 2003/0101084 A1 * | 5/2003 | Otero Perez | ................... | 705/8 |
| 2003/0105711 A1 * | 6/2003 | O'Neil | ........................ | 705/39 |
| 2004/0064389 A1 * | 4/2004 | Force et al. | .................... | 705/34 |
| 2005/0080523 A1 * | 4/2005 | Bennett et al. | ................ | 701/22 |
| 2005/0165681 A1 * | 7/2005 | Heinemann et al. | ........... | 705/40 |
| 2006/0129412 A1 * | 6/2006 | Boss et al. | ..................... | 705/1 |

OTHER PUBLICATIONS

Martin, M: Managing the Budget—Budget guide for jail administrators, National Institute of Corrections, Department of Justice, Sep. 2002,, pp. 1-35.*
State of North Carolina: PF20 Enter/Display a Requisition, http://www.ncosc.net/sigdocs/sig_docs/cash_mgmt/PF20.html, pp. 1-3.*
U.S. Appl. No. 10/928,338 entitled *Methods, Systems and Computer Program Products for Monitoring Service Usage*, filed Aug. 27, 2004.

* cited by examiner

*Primary Examiner*—Hani Kazimi
*Assistant Examiner*—Bijendra K Shrestha
(74) *Attorney, Agent, or Firm*—Myers Bigel Sibley & Sajovec, P.A.

(57) ABSTRACT

Services accounts are managed by defining budget categories for the services accounts. Budgets are defined for the respective categories and rules are defined for the budget categories. Input on usage of the services is electronically received and the budgets are electronically adjusted based on the received input and the defined rules.

14 Claims, 3 Drawing Sheets

METHODS, SYSTEMS, AND COMPUTER PROGRAM PRODUCTS FOR MANAGING SERVICES ACCOUNTS THROUGH ELECTRONIC BUDGET ADJUSTMENTS BASED ON DEFINED RULES

FIELD OF THE INVENTION

The present invention relates to account management systems and methods of operating the same, and, more particularly, to methods, system, and computer program products for electronically managing services accounts.

BACKGROUND OF THE INVENTION

Many customers of service providers desire pay-per-use billing, at least for some services, and this desire may likely increase in the future due, in part, to a perception of better fairness in that pay-per-use allows a customer to pay only for what services are used. In this way, low-usage customers need not subsidize high-usage customers. Many customers may also desire to arrange their accounts into group accounts and/or bundled accounts. In the first case, a number of customers are gathered into one combined billing account (e.g., a cellphone family plan) and in the second case, a customer's multiple services (e.g., cellphone, music downloads, television, movie pay per view, local phone, long distance) are combined into one billing account. Although both types of combined accounts, and even combined accounts of other types, may be of convenience to a customer, these combined accounts may lack customer control and safety in that the accounts may not be fully compatible with a desire to budget expenditures (e.g., via a monthly budget for the family, business, etc.). Further, there appears to be a lack of functionality to adaptively re-budget among categories within a combined account. Given that a customer may desire to limit total expenditures in a given billing cycle to a particular amount, it may be desirable to manage the sub-accounts so that the billing cycle limit is not exceeded.

SUMMARY OF THE INVENTION

According to some embodiments of the present invention, services accounts are managed by defining budget categories for the services accounts. Budgets are defined for the respective categories and rules are defined for the budget categories. Input on usage of the services is electronically received and the budgets are electronically adjusted based on the received input and the defined rules.

In other embodiments of the present invention, the services accounts comprise accounts for a plurality of services and/or users.

In still other embodiments of the present invention, each respective category is associated with at least one of the plurality of services and/or at least one of the plurality of users.

In still other embodiments of the present invention, defining the rules comprises assigning priorities to the budget categories, respectively.

In still other embodiments of the present invention, a determination is made if service usage for one of the budget categories has exceeded a threshold. The budget for the one of the budget categories is increased by reducing the budget for another one of the budget categories having a priority associated therewith that is not greater than a priority associated with the one of the budget categories if the service usage for the one of the budget categories has exceeded the threshold.

In still other embodiments of the present invention, increasing the budget comprises increasing the budget for the one of the budget categories by reducing the budget for other ones of the budget categories such that lower priority budget categories are reduced before higher priority budget categories if the service usage for the one of the budget categories has exceeded the threshold.

In still other embodiments of the present invention, increasing the budget comprises increasing the budget for the one of the budget categories by reducing the budget for the other ones of the budget categories such that lower priority budget categories are reduced before higher priority budget categories and lower priority budget categories are reduced by a greater amount than higher priority categories.

In still other embodiments of the present invention, increasing the budget comprises increasing the budget for the one of the budget categories by reducing the budget for the other ones of the budget categories such that, among budget categories having a same priority level, budget categories having a greater budget are reduced by a greater amount than budget categories having a lesser budget.

In still other embodiments of the present invention, the threshold is a first threshold, and increasing the budget comprises increasing the budget for the one of the budget categories by reducing the budget for the other ones of the budget categories such that budget categories having a budget amount less than a second threshold are not reduced.

In still other embodiments of the present invention, an alert is invoked if insufficient budget amounts remain in the other ones of the budget categories to increase the budget for the one of the budget categories, if increasing the budget occurs at a frequency that exceeds a frequency threshold, and/or if increasing the budget occurs in a pattern that substantially matches a prohibited pattern, which may include patterns that may be or may be considered undesirable and/or potentially dangerous and/or possibly harmful in some way and/or possibly related to hacker activity in some respects.

In still other embodiments of the present invention, a notification of the adjustment to the budgets is sent to a user and/or a service provider.

In still other embodiments of the present invention, priorities are based on the services and/or users.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EXEMPLARY EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 1:
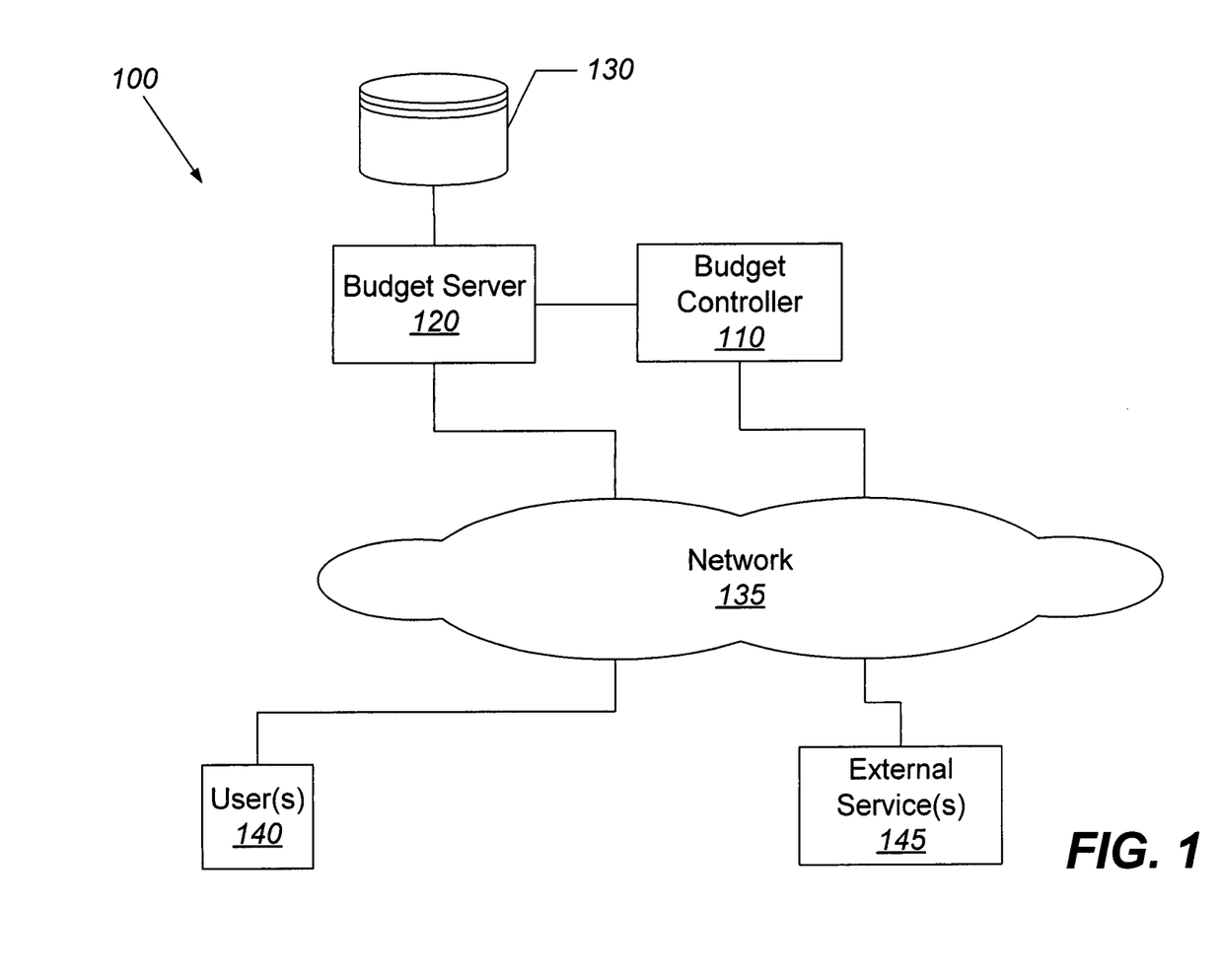
FIG. 1 is a block diagram that illustrates a communication network that includes a services account management system in accordance with some embodiments of the present invention.

Referring now to FIG. 1, an exemplary network architecture 100 that includes a services account management system, in accordance with some embodiments of the present invention, comprises a budget controller 110, a budget server 120, and a database 130 that are connected to a network 135 as shown. One or more users 140 and one or more external service providers 145 are also connected to the network 135 and use the network 135 to communicate with each other. The network 135 may comprise public communications networks, such as the Public Switched Telephone Network (PSTN), terrestrial and/or satellite cellular networks and/or the Internet. The network 135 may also, however, represent a wide area network, a local area network, an Intranet, or other private network, which may not accessible by the general public. Furthermore, the network 135 may represent a combination of public and private networks or a virtual private network (VPN). Additionally, the network 135 may be a wireless or a wireline network, or portions of the network may be wireless while other portions are wireline.

The budget controller 110 may be configured to communicate with the external service providers 145 and/or other service usage monitoring systems, for example, to obtain information for service usage for one or more services that are associated with connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Referring now to FIG. 1, an exemplary network architecture 100 that includes a services account management system, in accordance with some embodiments of the present invention, comprises a budget controller 110, a budget server 120, and a database 130 that are connected to a network 135 as shown. One or more users 140 and one or more external service providers 145 are also connected to the network 135 and use the network 135 to communicate with each other. The network 135 may comprise public communications networks, such as the Public Switched Telephone Network (PSTN), terrestrial and/or satellite cellular networks and/or the Internet. The network 135 may also, however, represent a wide area network, a local area network, an Intranet, or other private network, which may not accessible by the general public. Furthermore, the network 135 may represent a combination of public and private networks or a virtual private network (VPN). Additionally, the network 135 may be a wireless or a wireline network, or portions of the network may be wireless while other portions are wireline.

The budget controller 110 may be configured to communicate with the external service providers 145 and/or other service usage monitoring systems, for example, to obtain information for service usage for one or more services that are associated with one or more users 140. The services may correspond to a variety of technologies, in accordance with different embodiments of the present invention, including, but not limited to, cellphone service, music downloads service satellite/cable television service, movie pay per view service, local phone service, long distance phone service, gaming service, Internet service, online shopping service, etc. The external service providers and/or the service usage monitoring systems may include a budgeting agent that collects the service usage information and provides the service usage information to the budget controller 110. The budget controller 110 may include a usage input translator to translate the information received from the service providers 145 and/or the service usage monitoring system(s) into a usable form. A usage input filter may then be used to filter out undesired/unneeded information from the usage input translator. The budget controller 110 may be further configured to make adjustments in budgets for various categories associated with the users/services to assist a user/customer in maintaining an overall budget for multiple services and/or users. Exemplary operations of the budget controller 110 will be described in detail below.

The budget server 120 may be configured to communicate with a user/customer 140 to set up a combined account, i.e., an account that includes a plurality of services and/or users. The account owner may communicate with the budget server 120 to define an overall budget for the combined account, for instance by accessing a password-protected web page which might be provided by the budget server 120. The account owner may participate in defining budget categories for the combined account and budgets for the individual categories. The overall budget for the combined account and the individual categories may be defined for a particular time period, e.g., a month or a typical billing cycle. Rules may also be defined that the budget controller 110 uses to adjust the budgets for the individual categories based on how the services are used.

The budget server 120 may be further configured to notify a user, such as the account owner, and/or a service provider should the budget controller 110 adjust the budgets for one or more categories. If the budget amounts in certain categories are insufficient to allow the budget controller 110 to adjust the budgets for one or more categories, then an alert or alarm may be sent to a user, such as the account owner, and/or a service provider so that action may be taken if desired. Similarly, if adjustments to the budgets for the categories occur at a frequency that exceeds a frequency threshold, then an alert or alarm may be sent as the budgets for the individual categories may not be set to appropriate levels. An alert or alarm may be sent if the adjustments to the budgets for the categories occur in a pattern that substantially matches a prohibited pattern, as, for instance, this may indicate that a hacker is attempting to break into the system or the system is being manipulated in some undesirable way. The budget server 120 may also maintain a log to record changes to a combined account and the stimulus that at least partially caused those changes. The log may be used, for example, to debug or tune the budgeting system.

The database 130 may be used to store the various data used by the budget server 120 and the budget controller 110 in managing combined account(s). Thus, the database 130 may be referred to herein as a budget database and the budget controller 110 and the budget server 120 may, in combination, be referred to as a budget processor.

Although FIG. 1 illustrates an exemplary communication network, it will be understood that the present invention is not limited to such configurations, but is intended to encompass any configuration capable of carrying out the operations described herein.

Figure 2:
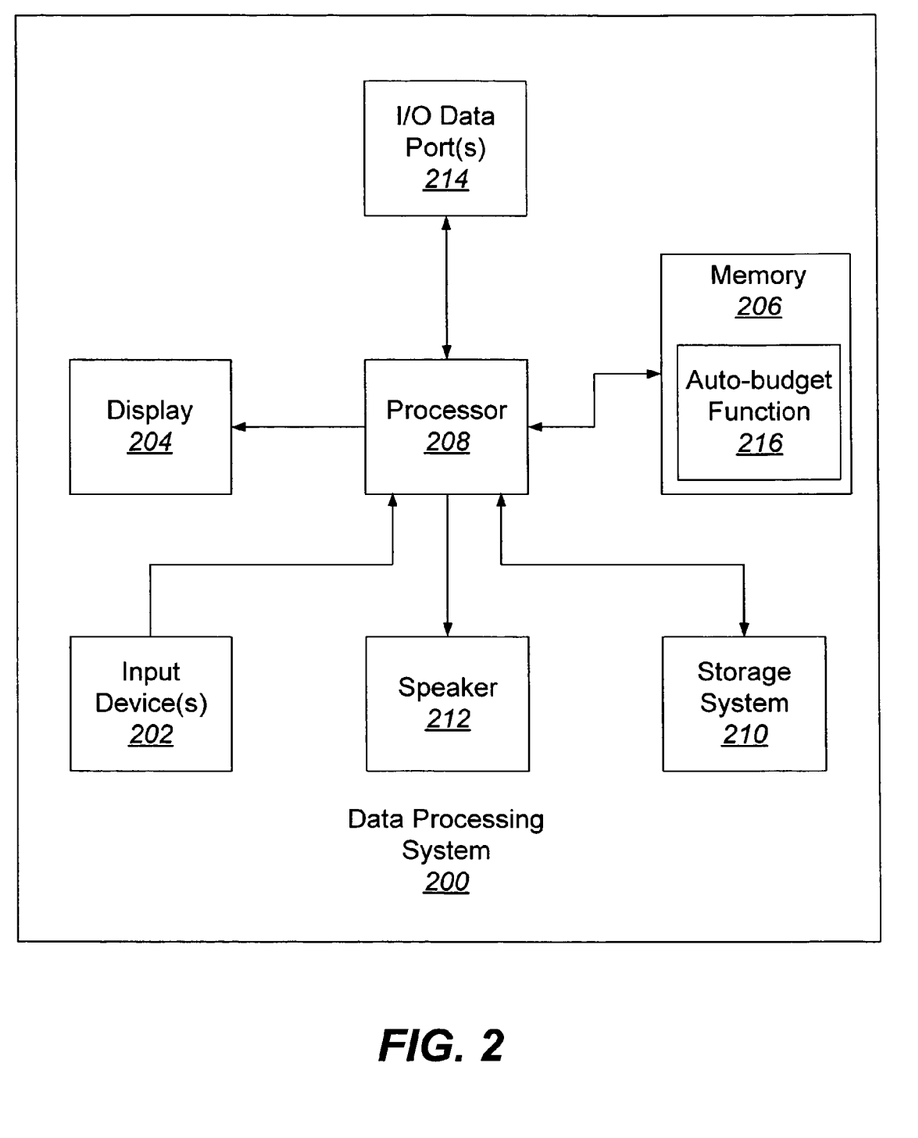
FIG. 2 illustrates a data processing system that may be used to implement various elements of the communication network of FIG. 1 in accordance with some embodiments of the present invention.

Referring now to FIG. 2, a data processing system 200 that may be used to implement the budget controller 110, budget server 120, external service(s) server(s) 145, and/or the user(s) 140 device(s) of FIG. 1, in accordance with some embodiments of the present invention, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, non-volatile/flash memory, hard disks, or the like, as well as virtual storage, such as a RAMDISK. The I/O data port(s) 214 may be used to transfer information between the data processing system 200 and another computer system or a network (e.g., the Internet). These components may be conventional components such as those used in many conventional computing devices, which may be configured to operate as described herein. The memory 206 may include an auto-budget function module 216 that is configured to implement the functionality of managing service accounts through electronic adjustments based on defined rules in accordance with some embodiments of the present invention.

The functionality of the data processing system 200 of FIG. 2 and the budget controller 110 and/or budget server 120 of FIG. 1 may be implemented as a single processor system, a multi-processor system, or even a network of stand-alone computer systems, in accordance with various embodiments of the present invention.

Computer program code for carrying out operations of data processing systems discussed above with respect to FIGS. 1 and 2 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations.

These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Exemplary operations for managing services accounts through electronic adjustments based on defined rules will now be described with reference to FIGS. 3 and 1. As discussed above, a user, such as an account owner, may establish a combined account on the budget server 120 in which multiple services and/or multiple users are managed as a single coordinated item. Thus, the services accounts comprising the combined account may be a single user associated with multiple services, a single service associated with multiple users, or other combinations between these two extremes.

At block 300 a user 140 in cooperation with the budget server 120, such as an account owner, define budget categories for services accounts. The services accounts may be a combined account as discussed above. In accordance with various embodiments of the present invention, each category may be associated with one or more user and/or one or more services. Thus, a budget category may correspond to a user who uses multiple services, multiple users who use one service, or any case in between these two extremes.

At block 305, the user 140 in cooperation with the budget server 120 defines budgets for the categories. These budgets may be percentages, fixed dollar amounts, credits, or the like, that are taken from a total budget allocated for the combined account. The user 140 in cooperation with the budget server 120 may then define rules and/or select and modify default rules for the budget categories at block 310. These rules may be a set of priorities that determine how the budgets for the individual categories are adjusted based usage of the services. For example, based on the manner in which the categories are defined and the priorities assigned, one or more users may be favored, one or more services may be favored, or any user/server combination may be favored. Adjustment of budgets based on service usage and the rules or priorities will be described in more detail below.

The budget controller 110 may receive input on the service usage at block 315. The service usage input may come from the Operations Support Systems (OSSs) associated with the external service providers 145 and/or from systems that are designed to track service usage, such as those described in U.S. patent application Ser. No. 10/928,338 entitled "Methods System and Computer Program Products for Monitoring Service Usage," the disclosure of which is hereby incorporated herein by reference. The input from the external service providers 145 may be automatically sent on a periodic basis and/or may be sent upon request from the budget controller 110.

Based on the input received at block 315 and the rules, e.g., priorities, defined at block 310, the budget controller 110 may adjust the budgets for the individual categories at block 320. In accordance with various embodiments of the present invention, the budget controller 110 may determine when the usage of a service associated with a first one of the categories has reached a level such that the budget has been exhausted or the budget remaining has reached a predefined threshold. The budget controller 110 may then increase the budget for this first category by taking budget away from one or more categories that have a lower priority than the first category. The budget controller 110 may take budget from the lowest priority categories first and proceed until reaching a priority level equal to that of the first category or a priority level immediately below the priority level of the first category. Equal budget amounts may be taken from other budget categories at the same priority level or higher budget amounts may be taken from lower priority categories than higher priority categories. In other embodiments, more budget may be taken from categories that have more budget available than categories with less budget available. This may be applied to categories at all priority levels or only categories having higher priority levels. In still other embodiments, the budget controller may not take budget from categories that have a remaining budget that is less than a predefined threshold.

At block 325, the budget controller 110 may optionally notify a user, such as an account owner that the budget(s) for the services account have been adjusted or re-allocated based on the usage and the pre-defined rules. However, the budget controller 110 may detect that future adjustments to the budgets for the various categories may be unable to maintain the integrity of the overall budget for the combined account. In this case, an alarm or alert may be invoked so that the impact persons/parties can take corrective action. The budget controller 110 may also send an alert/alarm if adjustments to the budgets for the categories happen with too great a frequency as this may be an indication that new budgets for the various categories needs to be redefined and/or the categories themselves need to be redefined based on the service usage. If the budget controller 110 detects certain patterns in the way that the budgets are adjusted for the various categories then an alert or alarm may be invoked because this may be indicative of a prohibited, undesired, potentially harmful, or dangerous behavior such as hacking or improper manipulation of system by a valid user.

Figure 3:
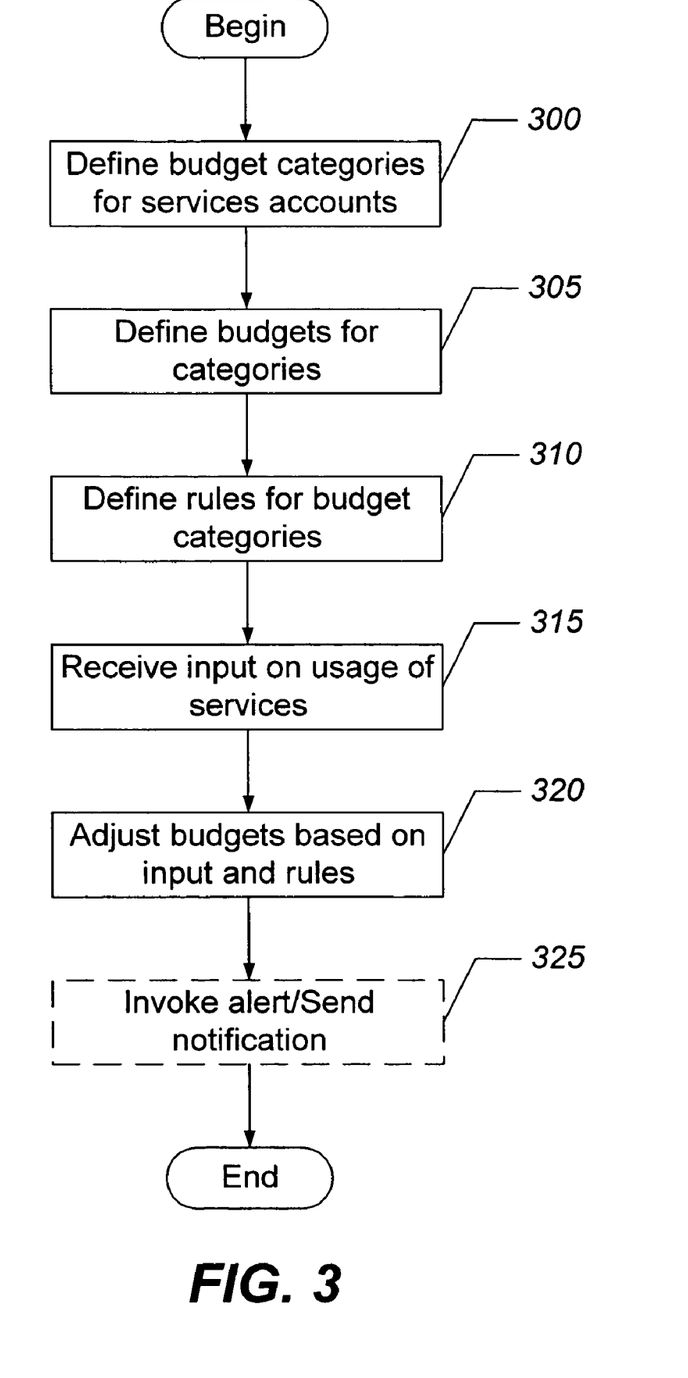
FIG. 3 is a flowchart that illustrates operations for managing services accounts through electronic budget adjustments based on defined rules in accordance with some embodiments of the present invention.

The flowchart of FIG. 3 illustrates the architecture, functionality, and operations of some embodiments of methods, systems, and computer program products for managing services accounts through electronic adjustments based on defined rules. In this regard, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

Some embodiments of the present invention may be illustrated by way of example. Ronald, his wife Sarah, and children James and Jennifer are a family that have subscribed to an automatic account management service in accordance with embodiments of the present invention. Ronald's family may represented as users 140 in FIG. 1. Ronald and Sarah wish to manage their cellular voice, cellular text messaging, cellular photo/video, long distance, cable TV pay per view, and audio MP3 download services as a combined account. The budget server 120 allows Ronald and Sarah to set an overall budget for the combined account along with initial budget categories, budgets for the categories, rules/priorities for adjusting the budgets for the individual categories, and notification/alert preferences. Ronald and Sarah have subdivided their total family service budget between themselves and their children James and Jennifer by allocating a certain amount of money per month to each family member and for each service. Sarah and Ronald have been given top priority with respect to their cellphone accounts. James and Jennifer have been given medium priority with respect to their cellphone services, but not text messaging or photo/video. Long distance has also been given medium priority. The rest is low or no priority.

During the course of a month, their budget limits in some of the various sub-accounts, i.e., categories, are reached. Sarah's cellular voice account budget is automatically increased. James and Jennifer exceed the allocations in their text messaging accounts, which are not increased. The pay per view cable TV and MP3 audio download accounts are decreased to the point that their budgets are entirely eliminated (the MP3 account by mid-month and the pay per view account by the last week of the month). Subsequently, the long distance account is slightly decreased by a re-budgeting event to increase Sarah's cellular voice account several days before the end of the month. Note that the lower priority accounts were robbed as needed to increase the higher priority accounts that exceeded their initial allocations and, thus, needed re-budgeting.

Service providers associated with these sub-accounts were notified when those accounts ran out of budget. In the case of the MP3 service, the provider suspended the service until the start of the next billing cycle. In the case of the cable TV pay per view, the provider allows an overage to occur, which will be applied to the following month's billing cycle. After a few months, Ronald and Sarah may review their combined account's history with respect to automatic adjustments to the budgets allocated to the various categories that they have defined and make modifications to their initial default allocations. In some cases they may contact one or more of the various service providers to request a different offered treatment option be applied when a budget depletion notification is sent to the provider, for instance changing the treatment allowing an overage to occur to a treatment that temporarily suspends the respective service (e.g., until the next billing cycle), or vice versa.

Advantageously, some embodiments of the present invention may allow for automated budget management of multiple service accounts that, historically, has been done manually. Multiple accounts spanning multiple people and services, in any combination, can be managed as one combined account. Categories can be defined for the various sub-accounts and the dynamic re-allocation of money among the various categories or sub-accounts may allow the party that is responsible for the combined account to maintain the integrity of the overall budget.

Many variations and modifications can be made to the embodiments described herein without substantially departing from the principles of the present invention. All such variations and modifications are intended to be included herein within the scope of the present invention, as set forth in the following claims.

That which is claimed:

1. A method of managing services accounts, comprising:
defining financial budget categories for the services accounts;
defining budgets for the categories, respectively;
defining rules for the financial budget categories;
electronically receiving input on actual usage of the services at a budget controller;
electronically adjusting the budgets based on the received input and the defined rules at the budget controller; and
determining if service usage for one of the financial budget categories has exceeded a threshold at the budget controller;
wherein defining the rules comprises assigning priorities to the financial budget categories, respectively; and
wherein adjusting the budgets comprises increasing the budget for the one of the financial budget categories by reducing the budget for another one of the financial budget categories having a priority associated therewith that is not greater than a priority associated with the one of the financial budget categories if the service usage for the one of the financial budget categories has exceeded the threshold.

2. The method of claim 1, wherein the services accounts comprise accounts for a plurality of services and/or users.

3. The method of claim 2, wherein each respective category is associated with at least one of the plurality of services and/or at least one of the plurality of users.

4. The method of claim 1, wherein increasing the budget comprises:
increasing the budget for the one of the financial budget categories by reducing the budget for other ones of the financial budget categories such that lower priority financial budget categories are reduced before higher priority financial budget categories if the service usage for the one of the financial budget categories has exceeded the threshold.

5. The method of claim 4, wherein increasing the budget comprises:
increasing the budget for the one of the financial budget categories by reducing the budget for the other ones of the financial budget categories such that lower priority financial budget categories are reduced before higher priority financial budget categories and lower priority financial budget categories are reduced by a greater amount than higher priority categories.

6. The method of claim 5, wherein increasing the budget comprises:
increasing the budget for the one of the financial budget categories by reducing the budget for the other ones of the financial budget categories such that, among financial budget categories having a same priority level, financial budget categories having a greater budget are reduced by a greater amount than financial budget categories having a lesser budget.

7. The method of claim 4, wherein the threshold is a first threshold, and wherein increasing the budget comprises:
increasing the budget for the one of the financial budget categories by reducing the budget for the other ones of the financial budget categories such that financial budget categories having a budget amount less than a second threshold are not reduced.

8. The method of claim 4, further comprising:
invoking an alert if insufficient budget amounts remain in the other ones of the financial budget categories to increase the budget for the one of the financial budget categories, if increasing the budget occurs at a frequency that exceeds a frequency threshold, and/or if increasing the budget occurs in a pattern that substantially matches a prohibited pattern.

9. The method of claim 1, further comprising:
sending a notification of the adjustment to the budgets to a user and/or a service provider.

10. The method of claim 1, wherein priorities are based on the services and/or users.

11. A budgeting system for managing services accounts, comprising:
a budget database that comprises financial budget categories for the services accounts, budgets for the categories, respectively, and rules for the financial budget categories; and
a budget processor that is configured to electronically receive input on actual usage of the services and to electronically adjust the budgets based on the received input and the defined rules;
wherein the budget database further comprises priorities assigned to the financial budget categories, respectively; and
wherein the budget processor is further configured to determine if service usage for one of the financial budget categories has exceeded a threshold and to increase the budget for the one of the financial budget categories by reducing the budget for another one of the financial budget categories having a priority associated therewith that is not greater than a priority associated with the one of the financial budget categories if the service usage for the one of the financial budget categories has exceeded the threshold.

12. The system of claim 11, wherein the services accounts comprise accounts for a plurality of services and/or users.

13. The system of claim 12, wherein each respective category is associated with at least one of the plurality of services and/or at least one of the plurality of users.

14. A computer program product for managing services accounts, comprising:
a computer readable storage medium having computer readable progfam code embodied therein, the computer readable program code comprising:
computer readable program code configured to define financial budget categories for the services accounts;
computer readable program code configured to define budgets for the categories, respectively;
computer readable program code configured to define rules for the financial budget categories;
computer readable program code configured to electronically receive input on actual usage of the services;
computer readable program code configured to electronically adjust the budgets based on the received input and the defined rules;
computer readable program code configured to determine if service usage for one of the financial budget categories has exceeded a threshold;
wherein the computer readable program code configured to define the rules comprises computer readable program code configured to assign priorities to the financial budget categories, respectively; and
wherein the computer readable program code configured to adjust the budgets comprises computer readable program code configured to increase the budget for the one of the financial budget categories by reducing the budget for another one of the financial budget categories having a priority associated therewith that is not greater than a priority associated with the one of the financial budget categories if the service usage for the one of the financial budget categories has exceeded the threshold.

\* \* \* \* \*

UNITED STATES PATENT AND TRADEMARK OFFICE
CERTIFICATE OF CORRECTION

PATENT NO. : 7,742,961 B2  Page 1 of 1
APPLICATION NO. : 11/250881
DATED : June 22, 2010
INVENTOR(S) : Aaron et al.

It is certified that error appears in the above-identified patent and that said Letters Patent is hereby corrected as shown below:

Column 12, Claim 14, Line 4: Please correct "progfam" to read -- program --

Signed and Sealed this

Thirtieth Day of November, 2010

David J. Kappos
*Director of the United States Patent and Trademark Office*